United States Patent [19]
Sugahara et al.

[11] Patent Number: 5,822,040
[45] Date of Patent: Oct. 13, 1998

[54] IMAGE TESTING METHOD

[75] Inventors: Koichi Sugahara; Tsutomu Kimura; Junji Sugano, all of Kanagawa; Jun Nakagawa; Ryoichi Hayashi, both of Tokyo, all of Japan

[73] Assignee: Fuji Photo Film Co., Ltd., Kanagawa, Japan

[21] Appl. No.: 672,957

[22] Filed: Jul. 1, 1996

[30] Foreign Application Priority Data

Jul. 3, 1995 [JP] Japan .................................. 7-167442

[51] Int. Cl.⁶ .............................. G03B 27/80; G03F 3/10
[52] U.S. Cl. .............................. 355/38; 358/506; 358/527
[58] Field of Search ................................ 355/20, 35, 37, 355/38, 32, 40, 41, 77; 358/524, 527, 506

[56] References Cited

U.S. PATENT DOCUMENTS

| | | | |
|---|---|---|---|
| 4,364,084 | 12/1982 | Akimoto et al. | 358/506 |
| 4,531,150 | 7/1985 | Amano | 358/506 |
| 4,782,390 | 11/1988 | Hayashi et al. | 355/38 |
| 4,935,809 | 6/1990 | Hayashi et al. | 358/527 |

*Primary Examiner*—A. A. Mathews
*Attorney, Agent, or Firm*—Sughrue, Mion, Zinn, Macpeak & Seas, PLLC

[57] ABSTRACT

An image testing method which improves an image testing ability and enables rapid testing processing. When an operator effects testing for an image displayed at a set test position and instructs alteration of a printing condition set by the testing, the image is scrolled and the next image is displayed at the test position without the altered image being displayed. When the next image is displayed at the test position, the operator starts testing for the next image without moving his/her line of vision.

20 Claims, 6 Drawing Sheets

TEST POSITION

TEST POSITION

IMAGE TESTING METHOD

BACKGROUND OF THE INVENTION

1. Field of the Invention

The present invention relates to an image testing method, and particularly to an image testing method for testing setting of a print-exposure condition such as image density.

2. Description of the Related Art

In recent years, by predicting a print result based on a negative film, an image is picked up by a television camera and is subjected to desired processing, and a desired image is accordingly printed. In this case, in order to print a proper image, an image testing operation is performed by an operator.

This testing operation by the operator will be described with reference to FIG. 4B. For example, a plurality of images are displayed on a monitor, an image on a frame to be tested is indicated by a cursor, and a visual testing operation is sequentially effected by the operator moving the cursor. As the result of the testing, an alteration in a printing condition such as proper density, color balance, and the like is indicated. After the alteration in the printing condition has been indicated and calculation has been made, an image on the monitor is changed to one after correction. When the changed image is confirmed by the operator, the testing operation for the image is completed. Thereafter, the subsequent image is specified as an image to be tested, by the operator operating the cursor key and the next image testing operation is started.

However, the testing operation as described above takes much time, and in recent years when the process rapidness is demanded, there is a need for improvement of the image testing. Correspondingly, there is a limit to achievement of the process rapidness by improving the processing ability in the operator's visual testing operation. On the other hand, it is also possible to automatically perform all of the testing processes as described above, but when a large number of images are corrected in accordance with a previously-set printing exposure condition, the occurrence of image frames for which correction has not been properly made cannot be avoided.

Further, while the testing operation can be performed in such a manner that a large number of images are displayed at the same time and are all looked out over by the operator, the operator must move his/her line of vision together with the movement of the cursor. For this reason, the testing operation relies heavily upon the operator's ability and the processing ability deteriorates accordingly.

Meanwhile, there has been proposed, as the prior art, negative testing in which a developed negative film is visually tested by an operator. In this method, since a negative film is used as it is, testing processing is effected for a negative image. In this case, it is possible for a skilled operator to test a large amount of frames in a short time, namely, it is possible to effect testing processing at a speed of 7,000 frames or more an hour. However, in order to effect testing processing while maintaining this speed, it is necessary that an operator become skillful in the testing processing. Therefore, the testing operation relies upon the operator's ability under the present circumstances.

As compared with this method, in the above-described automatic testing, since a positive image is prepared from a negative image, the testing processing can be effected with no skilled operator. However, since an image after correction is displayed, the processing speed decreases and is limited to the order of a speed of 3,000 frames an hour, which is approximately half that of the skilled operator.

On the other hand, a mini-laboratory where testing processing is effected for each negative is provided with a system for image testing in which positive images prepared from a negative film are displayed. However, since the mini-laboratory itself is originally not used for the purpose of processing a large amount of image frames, high speed processing cannot be effected, namely, the processing speed is limited to the order of a speed of 1,000 to 2,000 frames an hour.

SUMMARY OF THE INVENTION

In view of the above-described circumstances, it is an object of the present invention to provide an image testing method which improves an image testing ability and enables rapid testing processing.

A first aspect of the present invention is an image testing method in which images on a photographic film are extracted and displayed on display means and the images are tested so that a print exposure condition for each of the images is set and altered, comprising the steps of: displaying an image of the photographic film which is to be tested; initiating testing of the displayed image; and after adjusting the density and color balance of the image being tested as necessary, initiating testing of a next image without displaying the adjusted image.

In accordance with the first aspect of the present invention, the image to be tested is displayed and tested, and after the image has been adjusted as occasion demands, testing of a next image is initiated after the testing has been completed for the preceding image, displaying the adjusted image. Accordingly, it is possible to reduce time required for display and confirmation of the adjusted image and to effect the testing processing rapidly.

A second aspect of the present invention is an image testing method in the first aspect of the present invention, further comprising the steps of: specifying a test position, at which the image of the photographic film which is to be tested is displayed; when an image displayed at the test position is tested as the image to be tested, scrolling and displaying at least two continuous images in order; and displaying an untested image at the test position.

In accordance with the second aspect of the present invention, the test position at which the image to be tested is displayed can be fixed and the images to be tested are sequentially scrolled and tested. Accordingly, the position where the image to be tested is displayed can be fixed and the operator can effect testing for a plurality of images in order with his/her line of vision being kept fixed. Further, it is possible to lighten the burden imposed on the operator thereby to prevent deterioration of the processing ability.

A third aspect of the present invention is an image testing method in the second aspect of the present invention, in which the image having been tested and adjusted is displayed at an other position than the test position.

In accordance with the third aspect of the present invention, the adjusted image is displayed at an other position than at the test position and the test result can be confirmed. For example, when testing of the image at the test position has been completed and the image is moved, the image is displayed, as the adjusted image, at a position subsequent to the test position, thereby making it possible to prevent loss of time caused by switching of display. Accordingly, when similar images are successively disposed, since similar testings and confirmations are sufficient, the testing can be effected rapidly and efficiently without requiring similar labors.

A fourth aspect of the present invention is an image testing method in the first to third aspects, in which the image having been tested and adjusted can be displayed when an instruction for image display is given.

In accordance with the fourth aspect of the present invention, since the adjusted image can be displayed at an arbitrary time, it is possible to confirm the image when confirmation of the test result is required. Accordingly, it is possible to prevent creation of an inappropriate print result still further.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Referring now to the attached drawings, an embodiment of the present invention will be described in detail.

Figure 1:
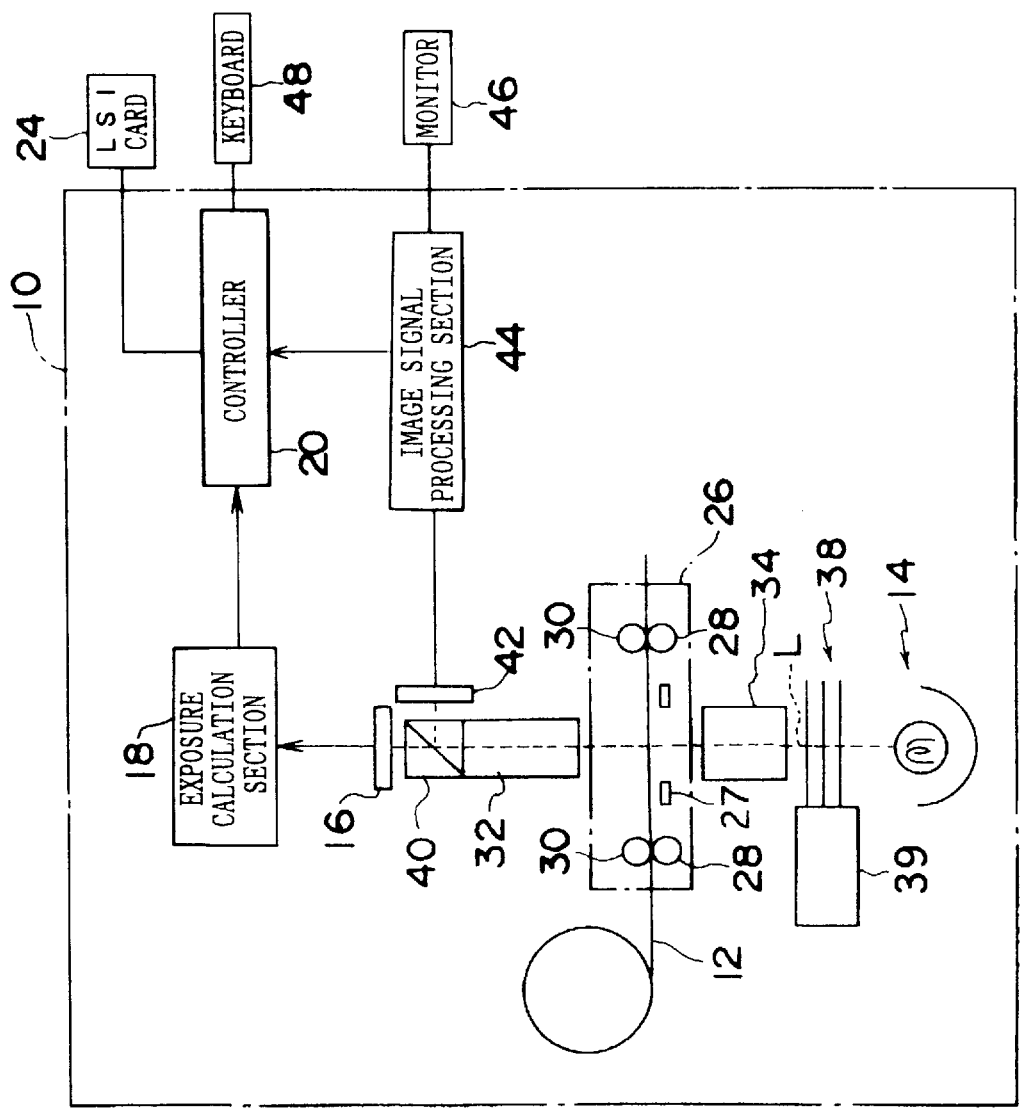
FIG. 1 is a schematic view of a scanner according to an embodiment of the present invention.

As shown in FIG. 1, a scanner 10 to which the present invention is applied includes a light source 14 formed by a halogen lamp and a reflector. Cut-off filters 38 of C(cyan), Mi(magenta) and Y(yellow) are provided on an optical path L for printing of light emitted from the light source 14. These cut-off filters 38 respectively advance onto and withdraw from the optical path L in accordance with signals from a driver 39.

A negative carrier 26 is disposed above the cut-off filters 38 on the optical path L for printing with a light diffusion barrel 34 disposed between the cut-off filters 38 and the negative carrier 26. The negative carrier 26 is constructed such that an elongated negative film 12 is positioned at a predetermined position by a negative mask 27 and is conveyed from one side to the other side thereof while being nipped by conveying rollers 28 and press rollers 30.

A CCD 16 for exposure calculation having 256×256 pixels is disposed at the uppermost position on the optical path L of light emitted from the light source 14. Meanwhile, the CCD 16 for exposure calculation includes, at the side where the light source 14 is disposed, an unillustrated filter in accordance with characteristics of the photographic film 12 and a printing paper.

The CCD 16 for exposure calculation is connected to an exposure calculation section 18 and measures an average transmittance density (i.e., LATD: Large Area Transmittance Density) of a transmission image of the negative film. The exposure calculation section 18 is connected to a controller 20 and transfers a measurement result to the controller 20.

A keyboard 48 is connected to the controller 20 and an operator can operate a predetermined key for adjusting density and color balance in a testing process so as to set, by the keyboard 48, an exposure correction value during exposure. As a result, the controller 20 sets exposure calculation data (correction value) for altering a print-exposure condition on the basis of the measurement value from the exposure calculation section 18 and data such as density and color inputted from the keyboard 48 by the operator.

The controller 20 includes an unillustrated memory, in which the exposure calculation data is temporarily stored, and causes the temporarily-stored exposure calculation data to be recorded on an LSI card 24.

A lens 32 and a prism 40 are disposed between the negative carrier 26 and the CCD 16 for exposure calculation.

The prism 40 causes a transmission image of the photographic film 12 to pass through and to be reflected at. The reflected transmission image is picked up by a CCD 42 for image input having 640×480 pixels and its signal is supplied to an image signal processing section 44. In the image signal processing section 44, unprocessed data of an image picked up by the CCD 42 for image input, negative-positive reverse data, negative-positive reverse data to which predetermined correction is applied, and the like can be created.

Figure 2:
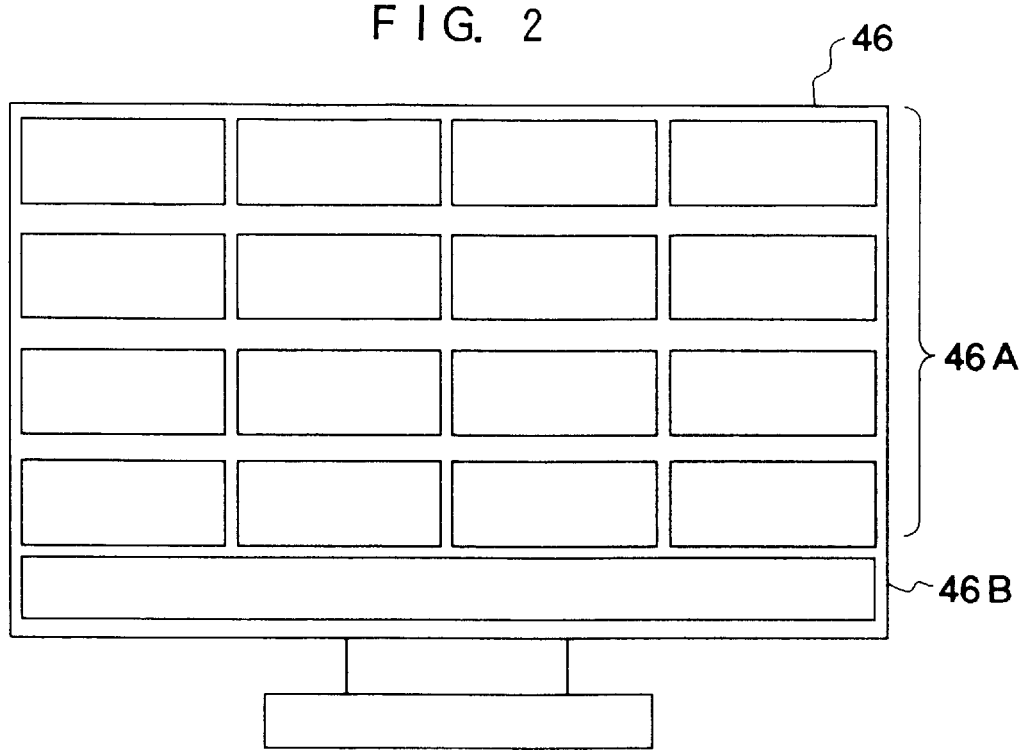
FIG. 2 is a front view of a monitor in the scanner according to the embodiment of the present invention.

A monitor 46 as shown in FIG. 2 is connected to the image signal processing section 44. The display surface of the monitor 46 is divided into an image frame indicating portion 46A and a message indicating portion 46B. The image frame indicating portion 46A is further divided into sixteen subsections and sixteen images can be displayed at the same time. An image converted into an electric signal (i.e., digital signal) by the image signal processing section 44 is displayed on each image frame surface. As a result, a positive image created from the image data picked up by the CCD 42 for image input is mainly displayed on the monitor 46 and the operator effects the testing operation while viewing images displayed on the monitor 46.

Next, an image testing method of the present invention will be described with reference to FIGS. 3 and 4A.

Figure 3:
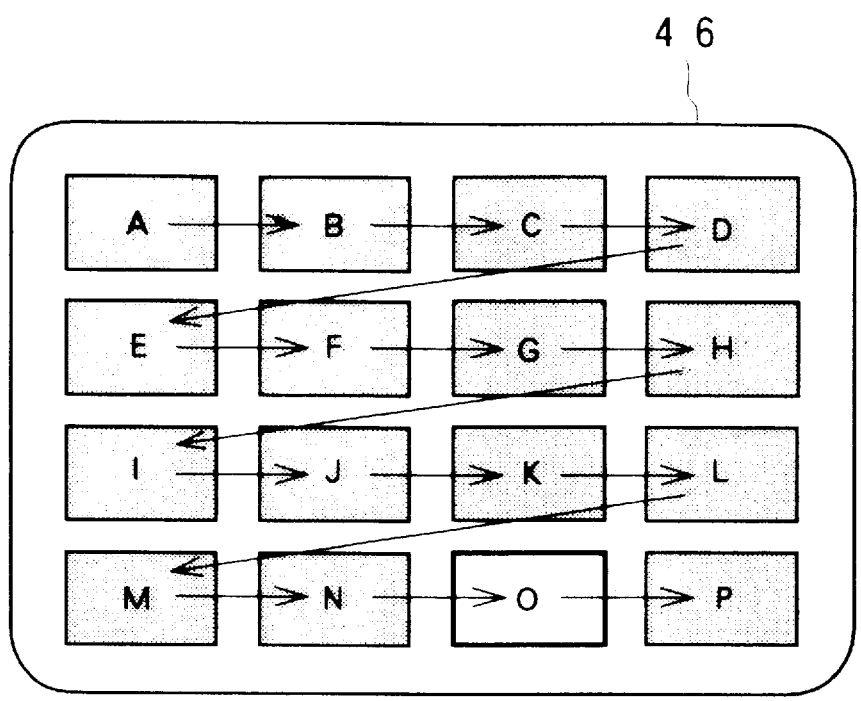
FIG. 3 is a diagram showing scrolling of images in a testing process of the embodiment of the present invention.

As shown in FIG. 3, sixteen image frames are displayed at respective positions of A (at an upper left position on the paper of FIG. 3) to P (at a lower right position on the paper of FIG. 3) on the monitor 46 (the message indicating portion 46B is not shown in FIG. 3). The final image is displayed at the position of A and scrolling is effected in the order of arrows.

Here, a test position is fixed at the position of O, and even when the testing processing has been completed for an image displayed on the position O, the test position is provided so as not to be changed. Namely, when the testing processing has been completed for the image displayed on the position O, the image displayed on the position O is moved to the position P after testing processing, and at the same time, an image displayed on the position N is automatically scrolled to the position O. Subsequent images are sequentially scrolled each one frame. In this way, the operator can perform the testing operation for one image constantly displayed on the position O. Further, when the test position is fixed at the position of O, the tested image is scrolled to and displayed at the position P. As a result, the content of the image for which the testing operation has been completed one frame before can be confirmed by the operator. Meanwhile, an amount of light for the image at the position O is made greater than those of images at other positions to more clearly indicate that the position O is the test position.

The operator effects testing for the image displayed at the position O which is the test position and alters and adjusts the printing condition by operating a color key and a density key which are arranged on the keyboard 48. The color key and the density key are each formed from a plurality of keys with grade numbers being indicated thereon so that the image to be tested can be subjected to color or density correction in the range of grades from +3 to −3 with a normal image set as the standard. For this reason, it suffices that the operator operates by selecting a key. Further, since the color key for correcting color balance is operated before operation of the density key, the density key is adapted to have a function of instructing shifting to the next image. Accordingly, when the operator effects adjustment by operating the density key and instructs alteration of the printing condition, scrolling of images is automatically effected and the next image is displayed at the test position. At the same time, calculation is made on the basis of the indicated value and the test result of the tested image is written in the LSI card 24.

Figures 4A, 4B:
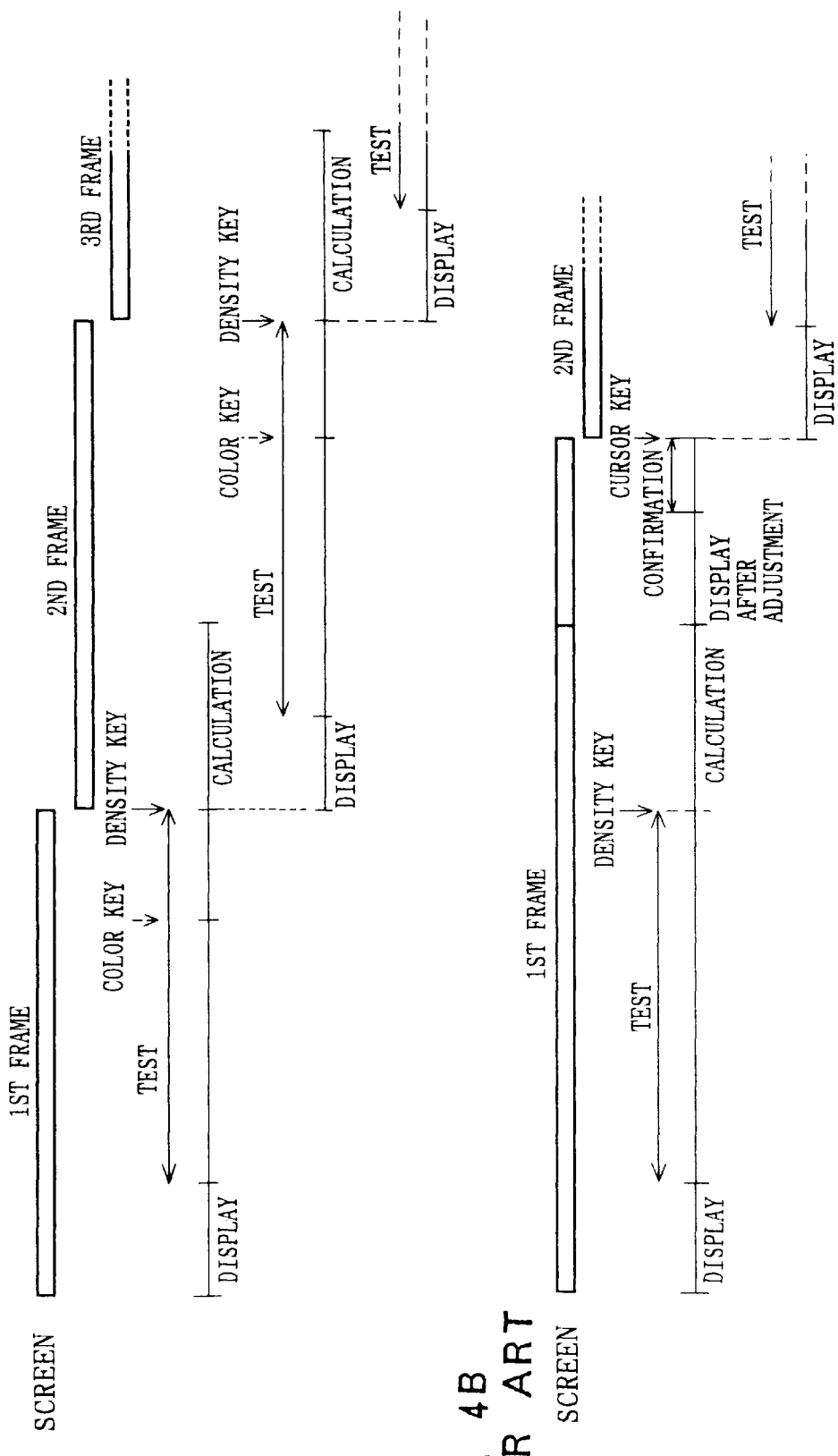
FIG. 4A is a diagram showing a work flow and a display screen in the testing process of the embodiment of the present invention.
FIG. 4B is a diagram showing a work flow and a display screen in a conventional testing process.

As shown in FIG. 4A, the image on the first frame is displayed and is tested by the operator, where calculation of the exposure correction value caused by alteration of the printing condition, and writing in the LSI card 24 are instructed. Thereafter, the next image frame is displayed without the corrected image being displayed. As a result, it is possible to save time for calculation, display of the corrected image, and the confirmation thereof, which have been conventionally observed as shown in FIG. 4B.

Accordingly, when the operator effects testing for the image displayed at the set test position and alteration of the printing condition set by the testing operation is instructed, the images are scrolled and the next image is displayed at the test position without the image after alteration being displayed. When the next image is displayed at the test position, the operator can start testing for the next image without moving his/her line of vision.

Meanwhile, as is conventionally well known, the photographic film 12 and the LSI card 24 are mounted in an unillustrated printer of a large-size laboratory, and printing is effected on the basis of the data recorded on the LSI card 24.

Next, an operation of the scanner 10 will be described.

When the elongated photographic film 12 is conveyed in a state of being set in the scanner 10, a predetermined image frame is sequentially set at a predetermined position of the negative carrier 26.

The CCD 16 for exposure calculation is used to pick up an image on a frame set in the negative carrier 26. The exposure calculation section 18 is used to make a calculation on the basis of an image inputted from the C(CD 16 for exposure calculation and to sequentially output exposure calculation data to the controller 20.

Substantially at the same time, the CCD 42 for image input is used to sequentially pick up the same images of frames as the images of frames picked up by the CCD 16 for exposure calculation and to supply their signals to the image signal processing section 44. The image signal processing section 44 sequentially creates positive image data on the basis of the inputted signals and displays the created plurality of positive images on the monitor 46 at the same time.

The operator effects testing for the image displayed on the test position and instructs, from the keyboard 48, alteration of the printing condition due to the test result by a predetermined key operation.

In accordance with the instruction from the operator, the controller 20 is used to set a proper print-exposure correction value for each image and to record the same on the LSI card 24.

Thereafter, by setting the LSI card 24 and the photographic film 12 in an unillustrated printer of the large-size laboratory, the printer can effect proper printing based on the exposure correction value caused by alteration of the printing condition.

Figure 5:
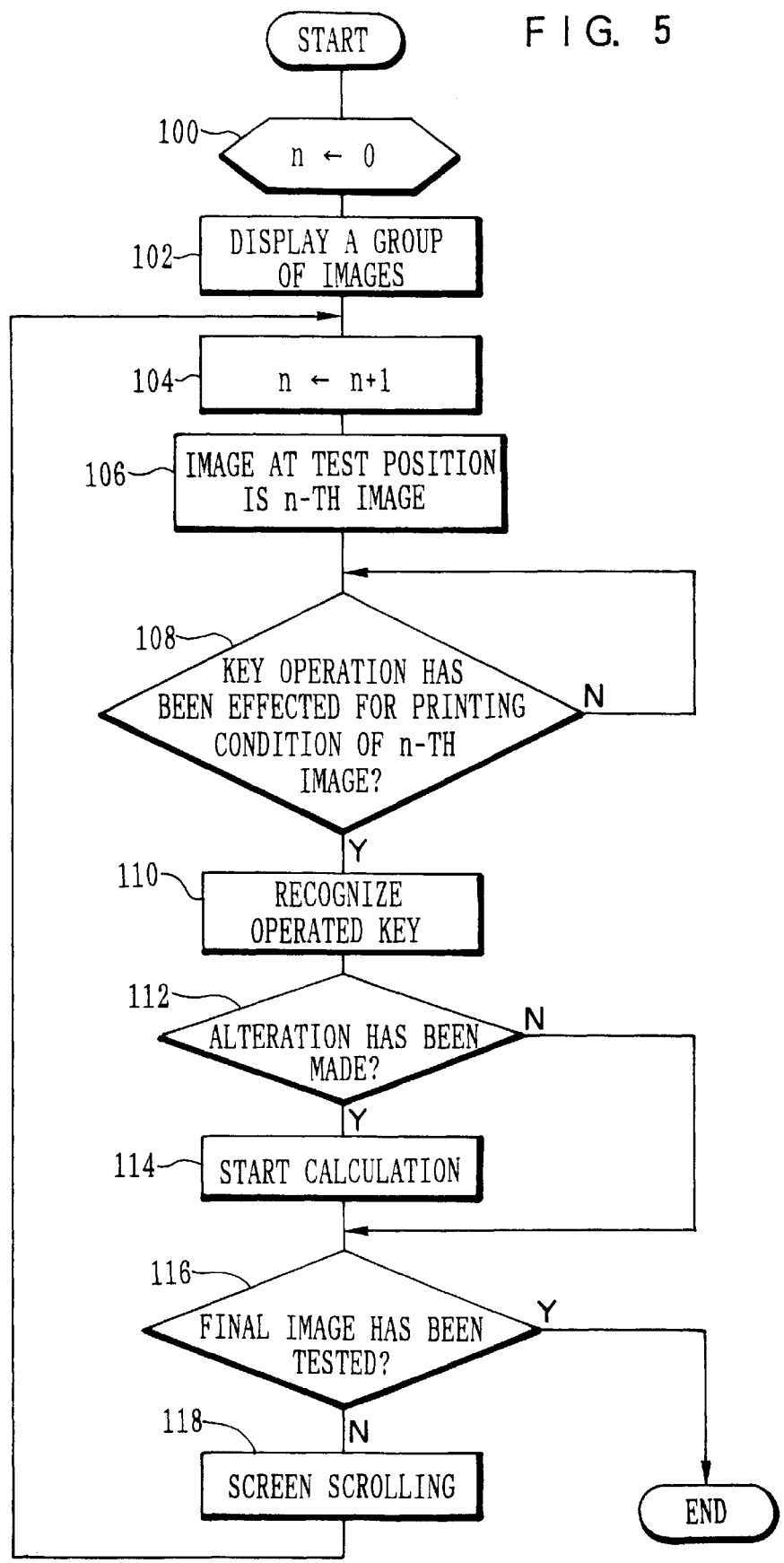
FIG. 5 is a flow chart showing a testing method according to the embodiment of the present invention.

Next, a description will be given of the testing process with reference to FIG. 5.

When a group of images recorded on the negative film 12 are read by the CCD 42 for image input and is transferred to the image signal processing section 44, the value of n is reset (0) in step 100. Thereafter, in step 102, a group of images of a predetermined number are displayed on the image frame indicating portion 46A of the monitor 46 in order. In this case, initially, these images are displayed such that an image on the first frame among the group of images is located at a predetermined test position.

When the group of images is displayed, the value of n is incremented in step 104 and the routine proceeds to step 106 in which the image at the predetermined test position is recognized as the n-th image.

When the image at the test position has been recognized, in step 108, it is determined whether or not a key operation has been effected for the printing condition of the n-th image. The n-th image displayed at the test position is tested by the operator. The operator determines whether or not the predetermined condition such as density, color and the like should be altered (testing), and instructs alteration of the printing condition by a predetermined key operation on the keyboard 48 on the basis of the determination result (adjustment). For example, the key operation is effected by selecting any one of the keys arranged with grade numbers of +3 to −3 (including 0) being indicated thereon. When the printing condition is not altered, the key of "0" indicated thereon is operated. Meanwhile, when color balance adjustment is required, it is effected before density adjustment.

When the key operation has been effected, the operated key is recognized in step 110.

When the kind of key and the adjustment grade has been recognized, in step 112, it is determined whether or not the printing condition has been altered. When the adjustment grade selected by the recognized key is set at any of grades other than "0", the determination of the step 112 is yes and the routine proceeds to step 114. In step 114, calculation for alteration of the printing condition is made on the basis of the kind of adjustment and the adjustment grade indicated by the operated key. Further, when the printing condition has not been altered, i.e., when respective adjustment grades of the recognized color balance key and density key is both "0", the determination of step 112 is When calculation for alteration of the printing condition starts, or when it is determined that the printing condition has not been altered, the routine proceeds to step 116 in which it is determined whether or not the final image has been tested.

When the n-th image is not the final image inputted into the image signal processing section 44, the determination of step 116 is no. The routine proceeds to step 118 in which the screen is scrolled and the next image is displayed at the test position, and the routine returns to step 104. In step 104, the value of n is incremented and the testing operation for the next image is effected.

Meanwhile, when the n-th image is the final image, the determination of step 116 is yes and the routine ends.

As a result, after the operator has effected testing for the image, the operator can effect testing for the next image only by giving the instruction of calculation and without displaying the test result on the screen, thereby making it possible to effect testing rapidly. Further, the monitor 46 is divided to display a plurality of images thereon, the test position is set fixedly, and after testing, the tested image is scrolled so that the next image is moved to the test position. For this reason, the testing operation can be effected without causing the operator to move his/her line of vision.

Since the density key is also used as the key for indicating display of the next image, the key operation of the operator can be reduced.

Accordingly, testing of the plurality of images is effected in order with the line of vision of the operator being kept fixed and the next image is tested without the tested image being displayed. This makes it possible to effect the testing operation rapidly and efficiently.

Figure 6A:
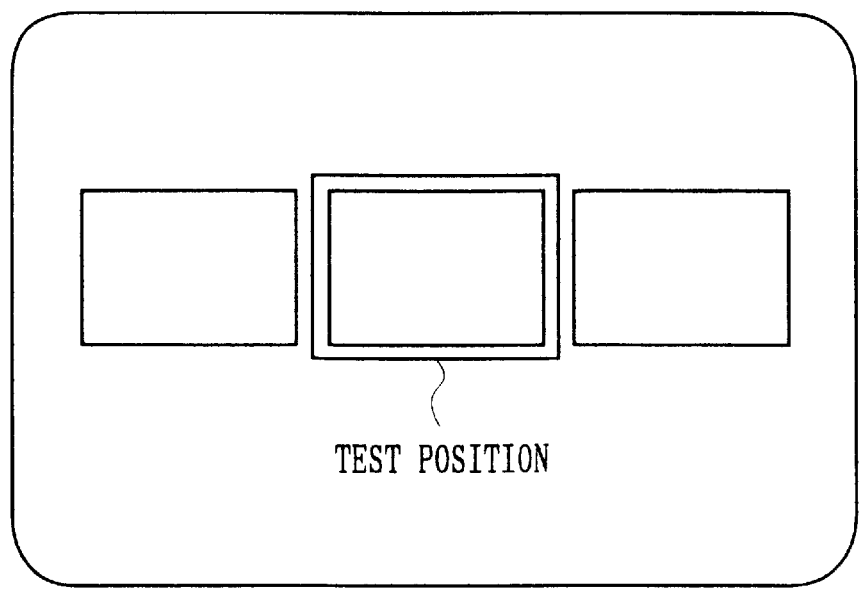
FIGS. 6A and 6B are diagrams showing another embodiments of a test image display screen in the present invention.
Figure 6B:
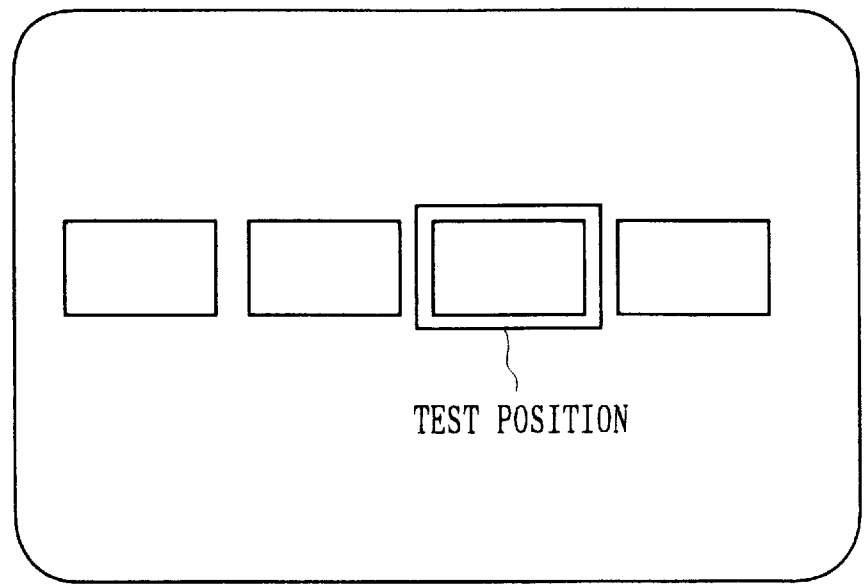

In the present embodiment, the number of images to be displayed on the monitor 46 for the testing operation is set sixteen and the position of O shown in FIG. 3 is set as the test position. However, the present invention is not limited to the above-described number and test position. The number of images and the testing position to be displayed on the monitor can be arbitrarily set in advance. For example, as shown in FIGS. 6A and 6B, the number of images may be three or four and the test position may be set at a central position or a third position. Moreover, only the image to be tested may be displayed on the monitor 46. As a result, the same effects as those of the present embodiment can be obtained, and the size of the image to be displayed on the monitor 46 can be enlarged by decreasing the number of images to be displayed to an appropriate number. Further, since there is a few possibility that the line of vision of the operator move, it is possible to lighten the burden imposed on the operator still further.

In the present embodiment, testing of the next image is effected in such a manner that the tested image is not displayed on the monitor 46 to confirm the test result thereof. However, the testing operation can be altered so that the tested image is displayed by a predetermined key operation to confirm the test result thereof. As a result, the testing operation can be effected reliably and efficiently in such a manner that only images which are required to be confirmed are selected and displayed and other images are not displayed.

Further, after testing has been effected for the image at the test position, when the screen is scrolled, the tested image may be displayed, for example, at the image display position subsequent to the test position. This makes it possible to confirm the test result without deteriorating the processing efficiency.

Meanwhile, the present embodiment is applied to the scanner 10 which reads, at a high speed, a group of images on the roll-shaped negative film 12 in the large-size laboratory, but the present invention is not limited to the scanner 10. For example, the present invention can also be applied to a mini-laboratory and the same effects as the aforementioned can be obtained. In this case, the testing operation may be effected for each of the images to be printed, or a group of images may be read by a CCD sensor or the like before printing and the plurality of images may be displayed and tested on the monitor at the same time in the same way as in the large-size laboratory.

As described above, the present invention makes it possible to provide the image testing method which improves the image testing ability and enables rapid testing processing.

While the embodiments of the present invention, as herein disclosed, constitute a preferred form, it is to be understood that other forms might be adopted.

What is claimed is:

1. An image testing method in which images on a photographic film are extracted and displayed on display means and the images are tested so that a print exposure condition for each of the images is set and altered, comprising the steps of:

displaying an image of the photographic film which is to be tested;

initiating testing of the displayed image; and after adjusting the density and color balance of the image being tested as necessary, initiating testing of a next image without displaying the adjusted image.

2. An image testing method according to claim 1, further comprising the steps of:

specifying a test position, at which the image of the photographic film which is to be tested is displayed;

when an image displayed at the test position is tested, scrolling and displaying at least two continuous images in order; and displaying an untested image at the test position.

3. An image testing method according to claim 2, wherein the image having been tested and adjusted is displayed at a position other than the test position.

4. An image testing method according to claim 1, wherein the image having been tested and adjusted can be displayed when an instruction to display the image is given.

5. An image testing method according to claim 2, wherein the image having been tested and adjusted can be displayed when an instruction to display the image is given.

6. An image testing method according to claim 3, wherein the image having been tested and adjusted can be displayed when an instruction to display the image is given.

7. An image testing method according to claim 1, wherein the adjustment of density and color balance is made by a key operation, and when the adjustment of density and color balance is not required, a key of "0" indicated thereon is operated.

8. An image testing method according to claim 7, wherein the adjustment of color balance is made before the adjustment of density, and when a key operation of the adjustment of density is effected, a next image to be tested is displayed.

9. An image testing method according to claim 2, wherein the adjustment of density and color balance is made by a key operation, and when the adjustment of density and color balance is not required, a key of "0" indicated thereon is operated.

10. An image testing method according to claim 9, wherein the adjustment of color balance is made before the adjustment of density, and when a key operation of the adjustment of density is effected, a next image to be tested is displayed.

11. An image testing method in which images on a photographic film are extracted and displayed on display means and the images are tested so that a print exposure condition for each of the images is set and altered, comprising the steps of:

scrolling and displaying at least two continuous images on the photographic film in order;

specifying a test position, at which an image of the photographic film which is to be tested is displayed;

displaying, at the test position, the image of the photographic film which is to be tested;

initiating testing of the displayed image; and after adjusting the density and color balance of the image being tested as necessary, displaying and testing a next image to be tested at the test position without displaying the adjusted image at the test position.

12. An image testing method according to claim 11, wherein the image having been tested and adjusted is displayed at a position other than the test position.

13. An image testing method according to claim 11, wherein the image having been tested and adjusted can be displayed when an instruction to display the image is given.

14. An image testing method according to claim 12, wherein the image having been tested and adjusted can be displayed when an instruction to display the image is given.

15. An image testing method according to claim 11, wherein the adjustment of density and color balance is made by a key operation, and when the adjustment of density and color balance is not required, a key of "0" indicated thereon is operated.

16. An image testing method according to claim 15, wherein the adjustment of color balance is made before the adjustment of density, and when a key operation of the adjustment of density is effected, a next image to be tested is displayed.

17. An image testing method in which images on a photographic film are extracted and displayed on display means and the images are tested so that a print exposure condition for each of the images is set and altered, comprising the steps of:

scrolling and displaying at least two continuous images on the photographic film in order;

specifying a test position, at which an image of the photographic film which is to be tested is displayed;

displaying, at the test position, the image of the photographic film which is to be tested;

initiating testing of the displayed image;

after adjusting the density and color balance of the image being tested as necessary, displaying the image having been tested and adjusted at a position other than the test position; and displaying and testing a next image to be tested at the test position.

18. An image testing method according to claim 17, wherein the image having been tested and adjusted can be displayed when an instruction to display the image is given.

19. An image testing method according to claim 17, wherein the adjustment of density and color balance is made by a key operation, and when the adjustment of density and color balance is not required, a key of "0" indicated thereon is operated.

20. An image testing method according to claim 19, wherein the adjustment of color balance is made before the adjustment of density, and when a key operation of the adjustment of density is effected, a next image to be tested is displayed.

* * * * *